Sept. 30, 1952 R. CHAPMAN 2,612,275
PRESS UNLOADER AND SHUTTER
Filed April 10, 1948 4 Sheets-Sheet 1

INVENTOR.
Ralph Chapman
BY
Buckhorn and Cheatham
Attorney

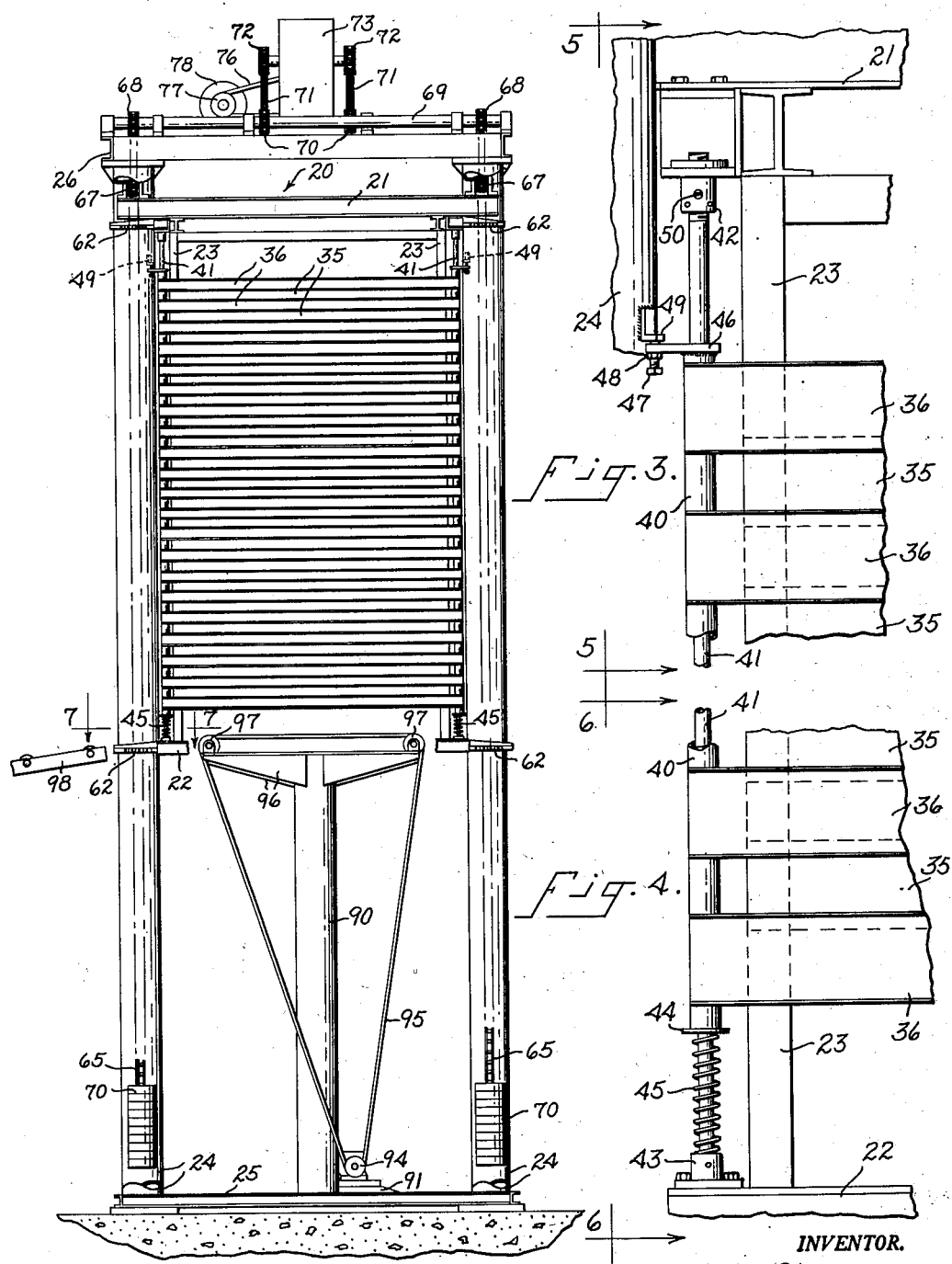

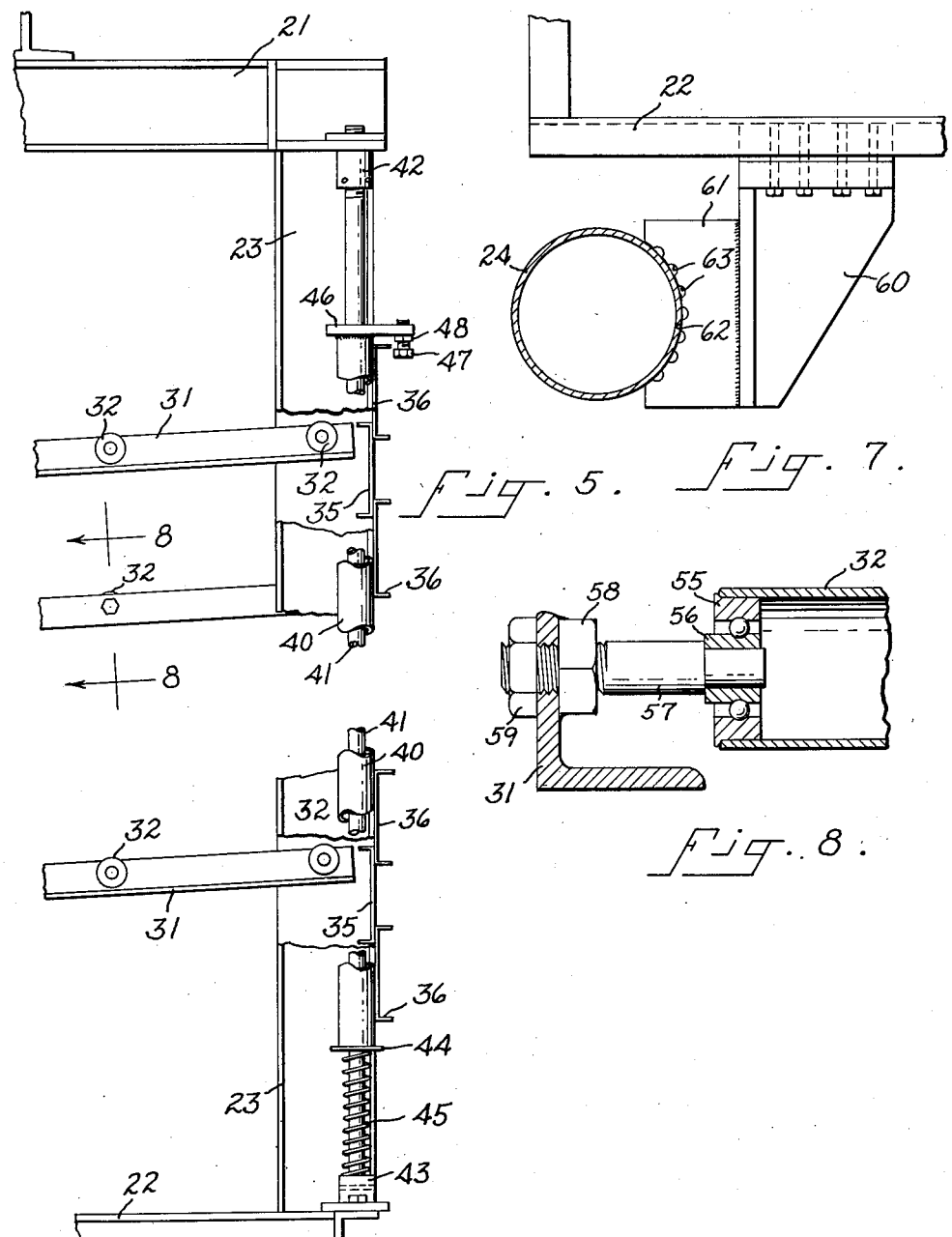

Sept. 30, 1952  R. CHAPMAN  2,612,275
PRESS UNLOADER AND SHUTTER
Filed April 10, 1948  4 Sheets-Sheet 4
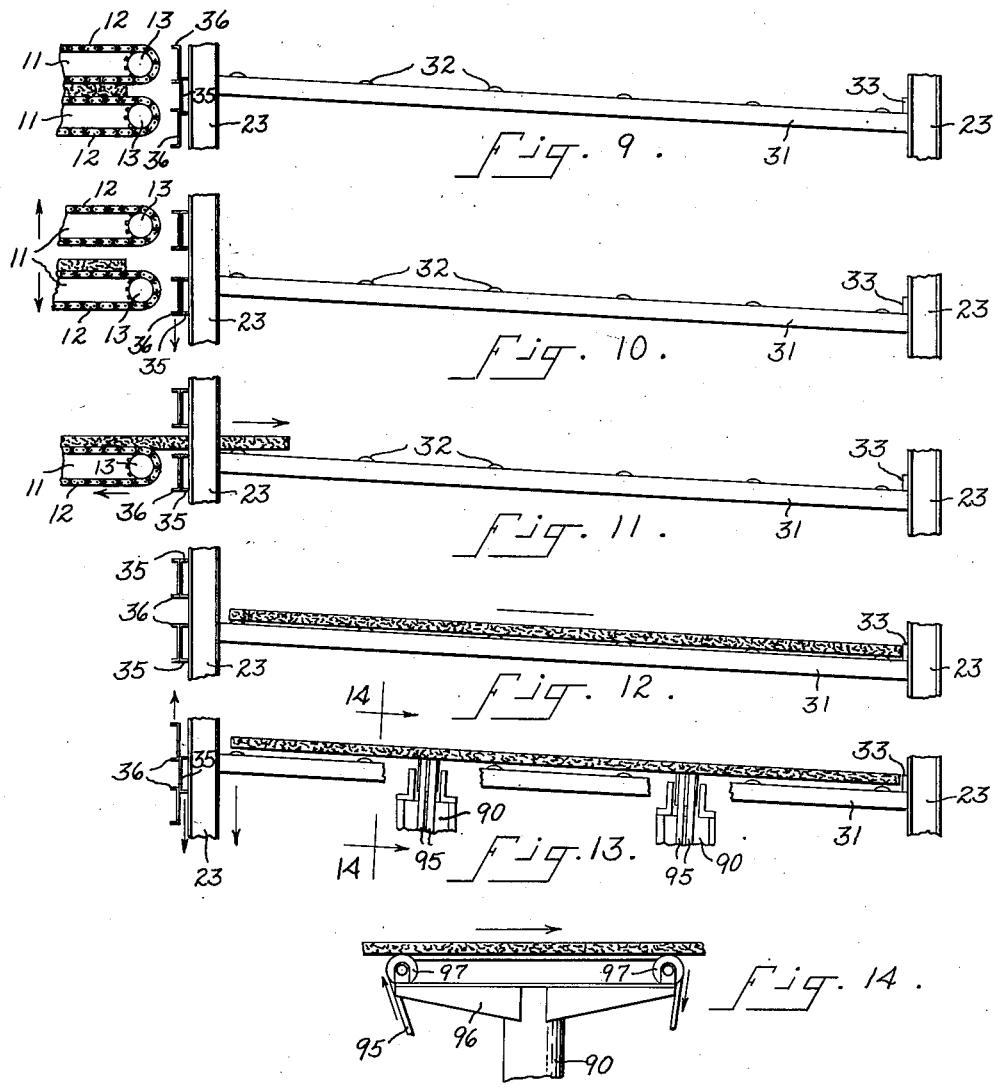
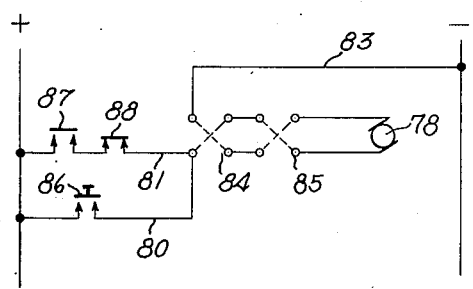
INVENTOR.
Ralph Chapman Patented Sept. 30, 1952

2,612,275

UNITED STATES PATENT OFFICE 2,612,275

PRESS UNLOADER AND SHUTTER

Ralph Chapman, Corvallis, Oreg., assignor to Chapman Forest Utilization, Inc., Corvallis, Oreg., a corporation of Oregon Application April 10, 1948, Serial No. 20,337

3 Claims. (Cl. 214—1)

My present invention comprises an unloading mechanism for a board consolidating press. In the manufacture of artificial boards wet mats of fibre are subjected to heat and pressure to cause the natural lignins and resins of the fibre, and sometimes added resinous binders, such as a phenolic resin in incipient C-stage, to be converted into end products, such as infusible, insoluble phenolic resin in C-stage, to bind the fibres in consolidated arrangement. The steps of heating and pressing may be accomplished in various manners by various means. One usual means comprises a multiple platen press in which a plurality of superimposed platens are simultaneously spread apart to permit reception of a plurality of wet mats in the spaces between the platens. When the platens ar brought together and heated above the boiling temperature of water the mats are dried, compressed and consolidated to form artificial boards. The boards are usually made in commercial sizes such as 4′ x 8′.

The unloading of such a press has been a difficult problem and usually means have been provided for removing single boards from the press. Such a method of operating requires considerable time which reduces the output of a board forming plant. The principal object of my invention is to provide means for simultaneously receiving all the boards from a multiple platen press so that the press can be reloaded with wet mats after a minimum delay.

A further object of the present invention is to provide means wherein a plurality of formed boards are received in superimposed relation in a vertically movable rack having means associated therewith for serially unloading the boards from the rack whereby the boards may be directed serially into inspecting, grading, humidifying, trimming, wrapping or other mechanisms.

A further object of the present invention is to provide a machine of the foregoing type which operates automatically to receive all of the charge of a multiple platen press and to unload them one after the other onto a conveyor.

The objects and advantages of the present invention may be more fully understood by reference to the accompanying drawings taken in connection with the following specification wherein like numerals refer to like parts throughout.

In the drawings,

Fig. 2 is an end elevation of the rack showing the relationship thereof to a conveyor mechanism for delivering the boards into subsequent machinery;

Fig. 3 is an enlarged detail view taken substantially from the plane 3—3 of Fig. 1;

Fig. 4 is an enlarged detail view taken substantially from the plane of line 4—4 of Fig. 1;

Fig. 5 is a view taken from the plane 5—5 of Fig. 3;

Fig. 6 is a view taken from the plane 6—6 of Fig. 4;

Fig. 7 is a sectional view taken from the line 7—7 of Fig. 2;

Fig. 8 is a sectional view taken along line 8—8 of Fig. 5;

Fig. 9 is a representation of one pair of press platens and one of the board receiving means in the unloading rack showing the relationship when the press is operating upon a board;

Fig. 10 is a similar view showing the relationship when the press is about to release boards into the unloading rack;

Fig. 11 is a similar view showing the board being fed into the unloading rack;

Fig. 12 is a similar view showing the board completely received in the rack;

Fig. 13 is a similar view showing the means associated with the rack for removing the boards serially from the rack;

Fig. 14 is a detail view taken substantially along line 14—14 of Fig. 13; and

Fig. 15 is a schematic wiring diagram.

Figure 1:
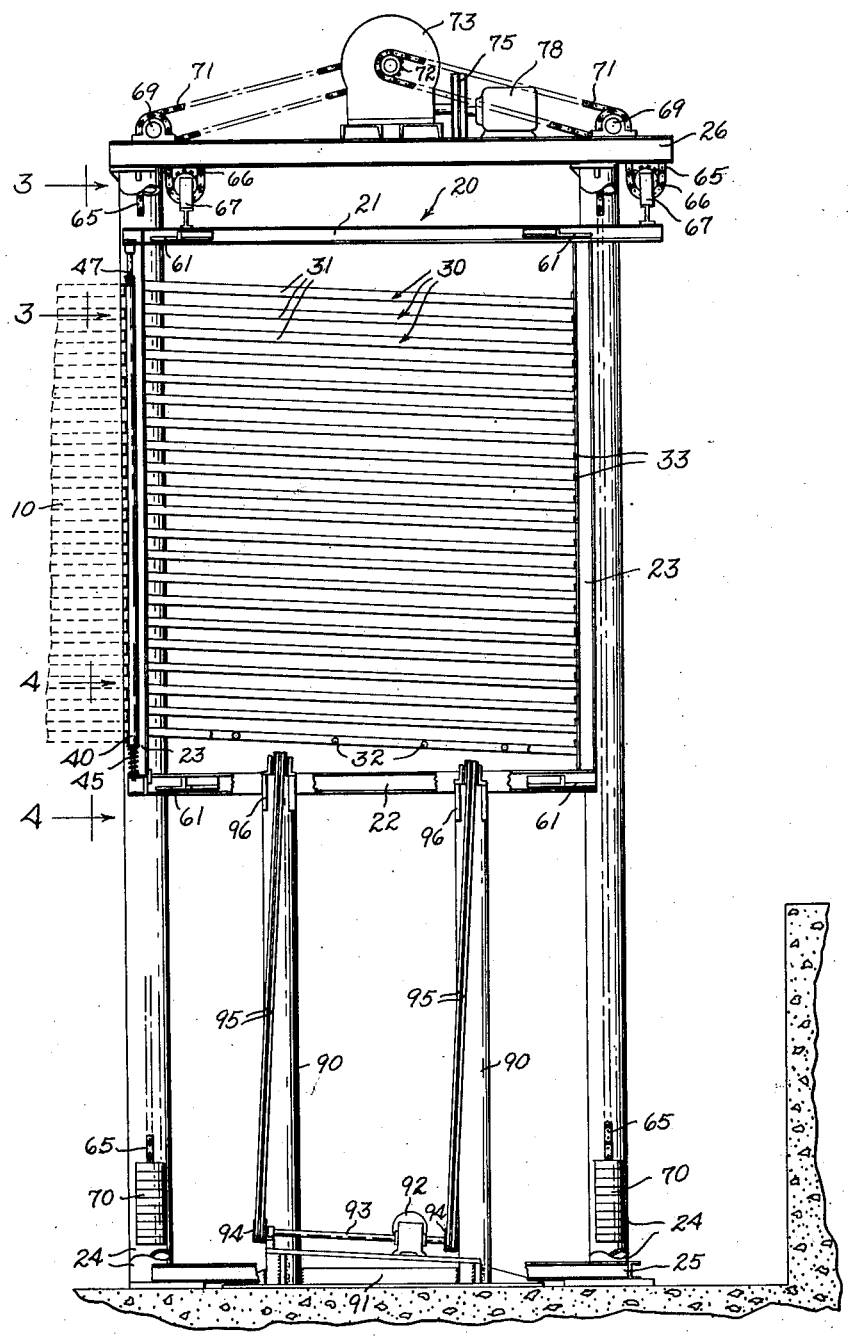
Fig. 1 is a side view in elevation of the unloading rack forming the present invention, showing the relationship thereof to a multiple platen press from which it receives boards.

The present invention is designed to be associated with a multiple platen press such as indicated at 10 (Fig. 1), the press comprising a plurality of superimposed platens 11 within which steam or other heating medium may be circulated. Each platen has associated therewith feeding means as exemplified by the sprocket chains 12 passed about the side edges of the platen, the chains being moved by sprockets 13. It is to be appreciated that the present invention will operate in conjunction with any multiple platen press having means for ejecting all of the boards formed therein when the platens are opened as seen in Fig. 10.

The present invention comprises a rack 20 including an upper frame 21, a lower frame 22, and vertical corner posts 23, the entire rack being guided for vertical reciprocation by the four guide posts 24. The posts extend into a pit or depression in the floor of the plant adjacent the press 10 so that the entire rack may be moved vertically from its position opposite the press, as seen in Fig. 1, to a position in which the frame 22 is near the floor of the pit. The posts 24 are braced by a bottom frame 25 and a top frame 26. Rack elevating means, to be described later, are mounted upon the top frame 26.

The rack comprises a plurality of board receiving means 30, each including side channel bars 31 extending from front to rear of the rack and mounted upon the upright frame members 23. The side bars 31 are inclined downwardly from front to rear and support a plurality of rollers 32 which extend above the side frame members and are capable of supporting thereon a board fed thereto from the press. A limit bar 33 extends across the lower end of each receiving space to stop the boards in vertical alignment. Since the board has been consolidated to a rigid, self-sustaining condition the rollers 32 may be spaced considerably.

Extending between the upright frame members 23 at the side toward the press are a plurality of fixed vanes 35 comprising inwardly facing channel bars, the upper flanges of which are positioned at levels corresponding to the upper corner of the side bars 31 and the lower flanges of which are spaced above the rollers 32 of the next lower set. The spaces between the fixed vanes 35 may be bridged by outwardly facing similar channel members 36 constituting movable vanes, the two sets of vanes being mounted back to back so that when the movable vanes 36 bridge the gaps between fixed vanes 35 an imperforate wall is provided to prevent steam and hot water from escaping from the press into the unloading rack, thereby protecting the finished boards. The fixed and movable vanes constitute a shutter which may be opened to leave spaces into which the finished boards may be fed when the movable vanes are moved to the levels of the fixed vanes, as seen in Figs. 10 and 11.

The movable vanes 36 are longer than the fixed vanes 35 and extend beyond the side frame members 23 at each end, the ends thereof being fixed to a pair of tubular slides 40 carried upon upright rods 41. Each rod 41 is longer than its associated slide. The upper end of the rod is threaded into a threaded member 42 which is rotatably mounted in a bracket fixed to the corner of the upper frame 21. The lower end of the rod 41 is pinned into a socket member 43 mounted upon the lower frame 22. The lower end of the slide 40 is provided with a flange 44 and a strong spring 45 is coiled about the rod 41 between the socket member 43 and flange 44. The upper end of sleeve 40 carries a bracket 46 in which is mounted an adjustable screw 47 which may be locked in adjusted position by a lock nut 48 with the tip of the screw extending upward above the bracket. The tip of the screw is aligned with an abutment 49 welded to one of the guide posts 24. The lower end of rod 41 is pinned into the socket member 43 and the upper end is threaded into the member 42 so that the member may be turned to set the tension of rod 41 whereupon the rod may be locked in position by a setscrew 50. The position of the screw 47 may be adjusted so that upon upward movement of the unloading rack the abutment 49 is engaged to depress the sleeve 40 until the associated movable vanes 36 open the gaps between the fixed vanes 35. Control means (not shown, as being within the skill of anyone in the art) may be associated with the movable vanes to limit upward movement of the rack so as to arrest the rack when the vanes are opposite each other as seen in Fig. 10. The spring 45 is compressed when the movable vanes are depressed and as soon as the rack is lowered immediately returns the movable vanes to their shielding position bridging the gaps between the fixed vanes. This is the position in which the movable vanes remain at all times except when the unloading rack is at its extreme upper position.

A preferred form of means for mounting the rollers 32 is illustrated in Fig. 8. The body of the roller preferably comprises a tube of light weight metal such as aluminum into the end of which is pressed the outer raceway 55 of a ball-bearing assembly. The inner raceway 56 is mounted upon a stud 57 extending through a nut 58 welded to the vertical flange of the side bar 31, the stud being locked in position by an outwardly accessible lock nut 59.

A preferred means for guiding the rack between the posts 24 is illustrated in Fig. 7 wherein it may be seen that brackets 60, which are mounted at each corner of each of the upper and lower frames, carry guide plates 61 in each of which an arcuate notch 62 is provided, the notch being of the same radius as the tubular guide posts 24 and engaging the outer surface thereof. The edge of notch 62 is preferably provided with a plurality of smaller notches 63 to prevent the plate from scraping lubricant toward the ends of the posts.

In order to elevate and lower the rack it is supported by a plurality of sprocket chains 65 from the top frame 26, one such chain being located at each corner of the frame. Each chain 65 is fixed at one end to the frame 26, passes about sprocket 66 mounted on a channel 67 at the upper corner of the upper frame 21 of the rack, then around a sprocket 68 fixed to a shaft 69 extending transversely of the top frame 26, then downward through the tubular post 24 and has its free end attached to a weight 70. The weights 70 partially counterbalance the weight of the rack 20 but their principal function is to keep the chains 65 taut in order that rotation of shafts 69 in either direction may accomplish movement of the rack. The shafts 69 are connected by sprocket chains 71 to a pair of sprockets 72 fixed to a shaft extending from each side of a reduction gear box 73, the gears of which are driven by a pulley 74 connected by belts 76 to the pulley 77 of a motor 78 mounted upon the top frame 26. The motor is of the reversible type and controlled manually or automatically, as the case may be, to operate in either direction.

Fig. 15 schematically illustrates a control circuit for motor 78. In this circuit a pair of lines 80 and 81 lead from the positive side and a single line 83 back to the negative side from a pair of reversible switches 84 and 85. Line 80 is controlled by a manual switch 86 which is normally open. Line 81 is controlled by a pair of switches 87 and 88 which are normally closed. Switches 84 and 87 are located at the top of the rack supporting frame and switches 85 and 88 are located at the bottom of the rack supporting frame, and switch 86 may be positioned at an operator's station. The circuit is shown in the arrangement of switches when the rack is resting at the top of its travel, in which case switch 88 remains closed and switch 87 has been opened to break the circuit to motor 78. When switch 86 is manually depressed the motor will be energized to initiate movement of the rack, thus permitting closure of switch 87, and the motor will remain energized until switch 88 is opened upon the rack reaching the bottom of its travel. Switches 84 and 85 are reversing switches placed in series with each other and so arranged that upon the rack reaching the top of its travel and at the instant that the circuit is broken, the circuit to the motor is reversed and vice versa, so that each succeeding movement of the motor initiated by manual depression of manual switch 86 is in the opposite direction from its preceding movement.

In order to unload the boards which have been fed into the rack from the press means are provided successively to engage the boards and feed them serially from the trays 30. This comprises a pair of vertical posts 90 extending upward from the floor upon which posts 24 are supported and connected at their bottoms by a frame 91. The posts 90 are of such height that the lowermost tray 30 is above the tops thereof when the rack is in its uppermost position and protrude slightly above the topmost tray when the rack is at its lowermost position. The posts are so spaced as to extend between adjacent rollers 32 in the rack trays. A motor 92 is mounted upon the base and a double-ended shaft 93 driven thereby has a pair of pulleys 94 mounted at its ends, each pulley being preferably of a multi-sheave type. The motor 92 and shaft 93 are inclined at the same angle as trays 30. The pulleys 94 are off-set a sufficient distance that belts 95 extending upward from each pulley normal to the shaft 93 will reach points opposite the midpoints of the posts. At the top of each post there is a transverse frame 96 extending from side to side of the clear space of the rack. An inclined sheave 97 is mounted at each corner of the frame 96 in alignment with the pulleys 94. The belts 95 pass about the sheaves 97 from the pulleys 94 and are stretched along the top of the frame 96 in position to engage the bottom surface of each board as it is moved downwardly in the rack 20. The speed of the belt 95 is much greater than the speed of movement of the rack 20 so that each board is ejected from the rack substantially as soon as it is lifted from the rollers 32, thus clearing each tray in succession and ejecting the boards serially onto a roller conveyor 98 or the like which leads the boards to the succeeding operating mechanism or operating stations.

Having illustrated and described a preferred embodiment of my present invention, it is to be understood that this invention permits of various modifications and arrangements.

I claim:

1. An unloader for a multiple platen fiberboard press comprising a rack having a plurality of vertically superimposed shelves each adapted to receive one of a plurality of boards from said press, a shutter mounted upon said rack at the side from which the boards are fed thereinto comprising a plurality of vertically spaced, fixed vanes and a plurality of vertically spaced, movable vanes normally bridging the spaces between said fixed vanes, means to elevate said rack to a position alongside of said press and to lower said rack to a position below said press, means for moving said movable vanes to open the spaces between said fixed vanes when said rack approaches the upper limit of its movement, and means automatically to feed boards deposited in said rack serially from the rack as it is being lowered.

2. An unloader for a multiple platen fiberboard press comprising a rack adapted to receive a plurality of boards from said press, said rack comprising a plurality of superimposed shelves, a shutter mounted upon said rack at the side from which the boards are fed thereinto comprising a plurality of vertically spaced, fixed vanes and a plurality of vertically spaced, movable vanes normally bridging the spaces between said fixed vanes, means to elevate said rack to a position alongside of said press and to lower said rack to a position below said press, said shelves lying opposite the platens of the press when the rack is raised and the press opened, a frame in which said rack is guided for vertical movement, spring means normally holding said movable vanes in their normal relation to said fixed vanes, fixed abutment means on said frame, means on said rack engageable by said abutment means for moving said movable vanes to open the spaces between said fixed vanes when said rack approaches the upper limit of its movement, and means automatically to feed boards serially from the rack as the rack is being lowered.

3. An unloader for a multiple platen fiberboard press comprising a rack having a plurality of roller shelves therein each adapted to receive a board laterally from between one of the opposed sets of platens in said multiple platen press, a shutter mounted upon said rack at the side from which the boards are fed thereinto comprising a plurality of vertically spaced, fixed vanes and a vertically slidable structure including a plurality of movable vanes normally bridging the spaces between said fixed vanes, means to elevate said rack to a position alongside of said press and to lower said rack to a position below said press, said shelves lying opposite the platens of the press when the rack is raised and the press opened, a frame in which said rack is guided for vertical movement, spring means normally holding said slidable structure in such position that said movable vanes close the gaps between said fixed vanes, a fixed abutment on said frame engageable with said slidable structure when said rack approaches the upper limit of its movement for moving said slidable structure to a position such that said movable vanes overlie said fixed vanes whereby the spaces between said fixed vanes are opened for the reception of boards from said multiple platen press, and means automatically to feed the boards serially from the rack as the rack is being lowered.

RALPH CHAPMAN.

REFERENCES CITED

The following references are of record in the file of this patent:

UNITED STATES PATENTS

| Number | Name | Date |
|---|---|---|
| 510,626 | Zeller | Dec. 12, 1893 |
| 1,518,278 | Schroeder et al. | Dec. 9, 1924 |
| 1,633,236 | Troiel | June 21, 1927 |
| 1,776,201 | St. Clair et al. | Sept. 16, 1930 |
| 1,903,102 | Farley | Mar. 28, 1933 |
| 2,200,708 | Towne et al. | May 14, 1940 |

FOREIGN PATENTS

| Number | Country | Date |
|---|---|---|
| 433,778 | Great Britain | Aug. 15, 1935 |